(12) United States Patent
Sanz Garcia et al.

(10) Patent No.: US 9,091,480 B2
(45) Date of Patent: Jul. 28, 2015

(54) ROTARY FURNACE FOR RADIATIVE HEAT TREATMENT OF SOLIDS

(75) Inventors: Elena Sanz Garcia, Lyons (FR); Matthieu Rolland, Vernaison (FR)

(73) Assignee: IFP Energies nouvelles, Rueil-Malmaison Cedex (FR)

( * ) Notice: Subject to any disclaimer, the term of this patent is extended or adjusted under 35 U.S.C. 154(b) by 1325 days.

(21) Appl. No.: 12/839,502

(22) Filed: Jul. 20, 2010

(65) Prior Publication Data

US 2011/0019981 A1 Jan. 27, 2011

(30) Foreign Application Priority Data

Jul. 21, 2009 (FR) ...................................... 09 03587

(51) Int. Cl.
| | | |
|---|---|---|
| *H05B 6/34* | (2006.01) | |
| *H05B 6/02* | (2006.01) | |
| *F27B 7/34* | (2006.01) | |
| *C10B 47/30* | (2006.01) | |
| *C10B 53/02* | (2006.01) | |
| *C10L 5/44* | (2006.01) | |
| *C10L 9/08* | (2006.01) | |
| *F23G 5/027* | (2006.01) | |
| *F23G 5/08* | (2006.01) | |
| *F23G 5/20* | (2006.01) | |

(52) U.S. Cl.
CPC . *F27B 7/34* (2013.01); *C10B 47/30* (2013.01); *C10B 53/02* (2013.01); *C10L 5/44* (2013.01); *C10L 9/083* (2013.01); *F23G 5/027* (2013.01); *F23G 5/08* (2013.01); *F23G 5/20* (2013.01); *Y02E 50/10* (2013.01); *Y02E 50/14* (2013.01); *Y02E 50/15* (2013.01); *Y02E 50/30* (2013.01)

(58) Field of Classification Search
CPC ............... H05B 6/02; H05B 6/36; H05B 6/24
USPC .............. 219/679, 698, 85.17, 420–427, 405; 392/351, 407, 410, 411, 416, 422, 423, 392/441; 201/4
See application file for complete search history.

(56) References Cited

U.S. PATENT DOCUMENTS 4,208,573 A * 6/1980 Risse ............................ 219/411
2008/0087135 A1* 4/2008 Hwang et al. ................ 75/10.13

FOREIGN PATENT DOCUMENTS

| DE | 2432425 A1 | 1/1976 |
|---|---|---|
| DE | 2432425 W | 1/1976 |

(Continued)

OTHER PUBLICATIONS

Institut National De La Propriete Industrielle. "Written Opinion". FR 0903587. Applicant: IFP. Mailed Feb. 10, 2010.

*Primary Examiner* — Tu B Hoang
*Assistant Examiner* — Thomas Ward
(74) *Attorney, Agent, or Firm* — Millen, White, Zelano & Branigan, P.C.

(57) ABSTRACT

A rotary furnace (1) for the heat treatment of solids includes at least one rotary tube into which the solids are introduced and a first heater outside of the rotary tube that makes it possible to conduct a portion of the heat treatment in the absence of oxygen. A second heater for heating feedstock to improve heat treatment is formed by a second heating element (4, 4', 4") positioned above the feedstock when the furnace rotates and at least one deflector panel that surrounds the heating element (4, 4', 4") is provided on the side opposite to the feedstock (2) and arranged inside of the rotary tube. The rotary furnace is used to roast solid biomass.

16 Claims, 2 Drawing Sheets

(56) References Cited

FOREIGN PATENT DOCUMENTS

| FR | 0903587 | R | 2/2010 |
|----|---------|---|--------|
| JP | 200537044 | A | 2/2005 |
| JP | 200537044 | W | 2/2005 |
| WO | 9733469 | A1 | 9/1997 |

* cited by examiner

ROTARY FURNACE FOR RADIATIVE HEAT TREATMENT OF SOLIDS

This invention relates to the field of furnaces for heat treatment of solids and more particularly furnaces for pyrolysis (or thermolysis) or roasting that are designed to treat solids such as wastes of any nature, and, for example, biomass.

Patents that describe rotary furnaces for pyrolysis or thermolysis, such as, for example, the patent FR 2 720 487 that relates to a rotary furnace that is applied to the pyrolysis of waste in which the radiative transfers are dominant because of higher temperatures (600° C.), are already known. The rotary furnace is a horizontal hollow tube that rotates around its axis of revolution and in which a solid flows. The furnace is slightly inclined, the input being higher than the output, such that with each revolution, the divided solids rise with the wall and drop a little to the front of their starting point. The speed of rotation and the slope of the furnace are selected to promote the mixing of the feedstock and therefore a homogeneous treatment of each particle.

In this type of device, the heat is primarily provided by the outside of the tube that is heated by circulation of hot gases around the tube (vapor, air, smoke from fuels that are diluted or cooled) or by radiation (electric or flame). The circulation of the gases inside the tube is low to avoid the pneumatic entrainment of particles, which limits the possibilities of transfer by convection. Given the high temperatures to which the furnace is heated, heat transfer to the feedstock is done primarily by radiation rather than by conduction (contact between the feedstock and the heated walls of the furnace).

In the case of the roasting of biomass, the required temperatures (between 220° C. and 300° C.) ensure that the radiative transfers are negligible. The transfers by conduction are proportional to the contact surface, to the temperature difference between the feedstock and the wall, and to a coefficient for heat transfer from the wall to the feedstock. The transfer coefficient depends on the properties of the feedstock and is not a parameter; it is typically equal to 10-20 W/m$^2$/° C. The feedstock/wall temperature difference is limited by the very nature of the lignocellulosic biomass. Beyond a temperature of 280-300° C. according to the gasolines, exothermic reactions begin and are self-sustained by the action of kinetic heat acceleration. These reactions lead to pyrolyzed solids having lost a large amount of their mass and their energy. The loss of yield is significant, and it is necessary to achieve conditions where the exothermic reactions may not have taken place.

For these reasons, the solution that is generally adopted for increasing heat transfer is the increase of the length of the rotary furnace for increasing the surface of contact with the biomass. This technique is expensive in terms of investment and energy consumption.

Another solution consists in increasing the dwell time in the furnace by reducing the slope of the furnace and by reducing the flow rate to preserve the same bed height, which leads to a reduction of the capacity.

Another solution that is described in the patent JP 2005037044 consists in using a heating radial plate in the rotary furnace for thermolysis, whereby this plate is attached on both sides to the walls of the furnace. The plate rotates with the furnace and emits radiation that heats the feedstock. To make it possible for the feedstock to circulate, the plate comprises perforations.

The patents JP2003307388 and WO 98/54273 describe a furnace that comprises a longitudinal heating element of the length of the thermolysis furnace emitting radiation that makes it possible to heat the feedstock.

One drawback of these last two solutions arises from the fact that the heating element emits in all directions and not only in that where the feedstock is found. There is therefore a significant energy loss, which increases the cost of heat treatment. In addition, the emission of radiation to the wall of the furnace, at locations where there is not any feedstock, heats the walls of the furnace excessively and runs the risk of then causing exothermic reactions.

The patent WO97/33469 describes a device of the same type, but the heating element is the only source of heat; in addition, this patent does not relate to the roasting of biomass.

The object of this invention is therefore to remedy one or more of the drawbacks of the prior art by proposing a rotary furnace that makes it possible to accelerate the heat treatment of solids and in particular biomass, to reduce the size of the equipment and therefore to reduce the cost of the roasting, while adhering to the maximum temperatures of the wall of the rotary furnace and limiting the exothermic reactions.

For this purpose, this invention proposes a rotary furnace that is designed for the heat treatment of solids comprising at least one rotary tube into which the solids are introduced and a heating means that is outside of the rotary tube that makes it possible to conduct a portion of the heat treatment in the absence of oxygen, characterized in that it comprises a second means for heating the feedstock for improving the heat treatment, formed by a heating element that is positioned to be above the feedstock when the furnace rotates and at least one deflector panel that surrounds the heating element at the side that is opposite to the feedstock, placed inside the rotary tube.

According to one embodiment of the invention, the heating element is rectilinear, longitudinal, and travels the entire length of the rotary furnace.

According to one embodiment of the invention, the section of the heating element is polygonal or round or egg-shaped.

According to another embodiment of the invention, the section of the heating element is flat or concave or convex.

According to one embodiment of the invention, the width of the heating element is between $1/60^{th}$ and $2/3$ of the inside diameter of the tube of the furnace, and the height is between $1/20$ and $4/4$ of the width of the heating element.

According to one embodiment of the invention, the heating element is attached by its ends independently of the tube of the furnace and does not rotate with the furnace.

According to one embodiment of the invention, the position of the heating element in the tube of the furnace is eccentric relative to the central longitudinal axis of the tube of the furnace, in the direction that is opposite to the one where the feedstock is located.

According to one embodiment of the invention, the heating element is hollow or solid, sealed or perforated.

According to one embodiment of the invention, the heating element is heated by circulation of a very hot gas inside the heating element or by combustion or by an electrical means.

According to one embodiment of the invention, the deflector panel is longitudinal and of the same length as the heating element.

According to one embodiment of the invention, the deflector panel consists of a single part or several parts that are linked to one another and that form a central part that is arranged above the heating element and two sides that are arranged on both sides of the central part.

According to one embodiment of the invention, the deflector panel is in the shape of a half-tube or comprises angles that are formed by the connection of the different parts that constitute it.

According to one embodiment of the invention, the two sides of the deflector panel are of a size that makes it possible for them to go beyond the heating element.

According to one embodiment of the invention, the two sides are oriented so as to form an angle that makes it possible for radiation to cover the entire surface of the bed of the feedstock.

According to one embodiment of the invention, the deflector panel is attached by its ends independently of the tube of the furnace and does not rotate with the furnace.

The invention also relates to the use of the rotary furnace for conducting the heat treatment of biomass.

According to one embodiment of the invention, the heat treatment is a treatment by roasting solid biomass.

According to one embodiment of the invention, the heat treatment is a radiative heat treatment of biomass.

Other characteristics and advantages of the invention will be better understood and will appear more clearly from reading the description given below by referring to the figures that are attached and provided by way of example:

The invention relates to a rotary furnace for heat treatment, such as, for example, roasting, of solids, and, for example, wastes of the household, agricultural, industrial and solid biomass types. The solid biomass that is treated in the device according to the invention can be, for example, lignocellulose (wood, straw, algae), purified lignin, cellulose or a mixture of these different biomasses. Biomass is generally in the form of chips whose thickness is between 1 mm and 30 mm; the width is between 1 mm and 40 mm; and the length is between 1 mm and 100 mm. The roasting that is done within the scope of the invention consists of a heat treatment that is done at mean temperatures of in general between 80° C. and 400° C., and preferably between 150° C. and 280° C., and in the absence of oxygen.

The rotary furnace is a standard furnace for thermolysis or pyrolysis as already described in the prior art. The rotary furnace is therefore formed by at least one primary sealed tube into which is introduced, by one end of the furnace, the feedstock to be treated, and which is heated by a first heating means and, for example, by circulation of hot smoke or by electric resistors or by burners that are arranged outside of the tube. The tube is thus heated to a temperature that does not exceed the maximum temperature allowed by the exothermic reactions, in general between 280° C. and 400° C. The primary tube in general rotates around a longitudinal axis that thus makes possible the stirring of the feedstock and therefore a homogeneous treatment. The tube of the furnace is in general made of steel that may or may not be stainless, with or without a coating.

Figure 1:
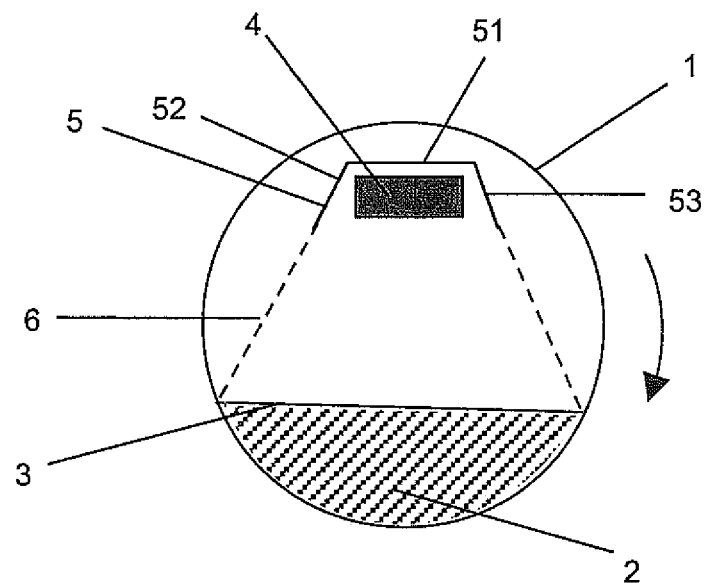
FIG. 1 is a diagrammatic representation of a transversal cutaway view of a variant of the device according to the invention.
Figure 2:
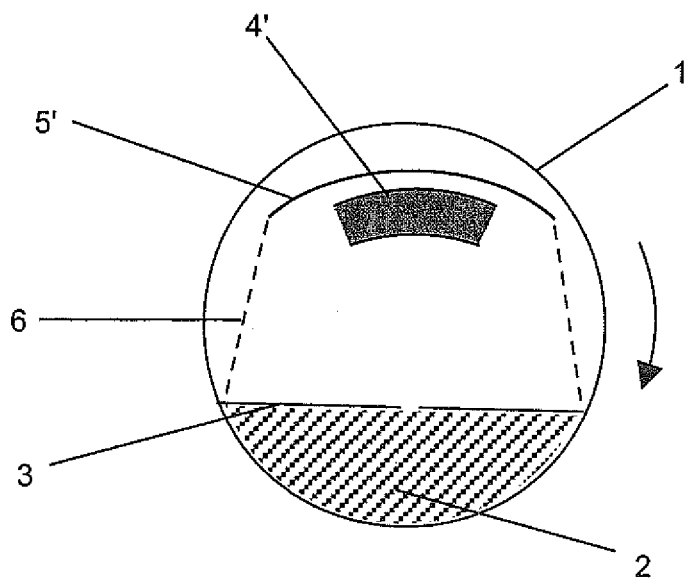
FIG. 2 is a diagrammatic representation of a transversal cutaway view of another variant of the device according to the invention.
Figure 3:
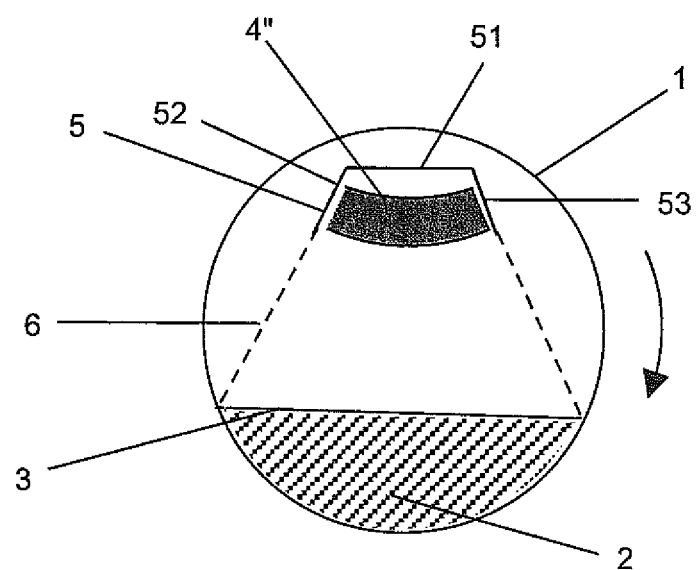
FIG. 3 is a diagrammatic representation of a longitudinal cutaway view of another variant of the device according to the invention.

The primary tube that forms the rotary furnace (1) according to the invention, illustrated in FIGS. 1, 2 and 3, comprises another radiative-type heat source without contact with the particles that make it possible to improve and/or to finalize the heat treatment begun with the first external heating means. The heat treatment is thus done by the combination of two heating means. This heat source is formed by a stationary heating element (4, 4', 4") that is incorporated inside the tube of the furnace. To be heating, this element (4, 4', 4") is heated to a temperature at which it radiates, i.e., above 600° C. The visible, infrared radiation (orange-red wall) or ultra-violet radiation emitted by this radiating element makes possible a transfer of heat to the feedstock (2) that is proportional to the radiation temperature (in K), power 4, according to the law of Stephan-Boltzmann: $\Phi$(flow in W/m$^2$)=$\sigma$T$^4$ and $\sigma$=5.675 10$^{-8}$ W/m$^2$/K$^4$. The intensity of the heat transfer is then greatly increased, with neither modification of the length of the tube of the furnace, nor increase of the dwell time of the feedstock in the reactor.

The heating element (4, 4', 4") that is also called a radiating element or a radiant element is designed so that only the feedstock bed (2) can receive the radiation: the rotary tube thus remains at the maximum temperature that is allowed by the exothermic reactions.

The feedstock (2) that is exposed to radiation is the feedstock on the surface (3) of the bed. Because of the rotation of the rotary furnace (1), the feedstock (3) that is exposed to radiation is constantly renewed, and the temperature of the feedstock remains homogeneous and below the critical threshold.

The temperature of the heating element (4, 4', 4") is therefore regulated so that the temperature of the feedstock remains below the critical threshold. The transfer of heat at a temperature with the power of 4 ensures that the regulating effects are fast enough to prevent heat excursions.

The heat treatment of the feedstock inside the furnace (1) is done in the absence of oxygen.

The heating element (4, 4', 4") is longitudinal and rectilinear in the direction of the length and travels the entire length of the furnace. It is arranged inside the tube of the rotary furnace (1) and in the direction of the length of the furnace. Its position in the tube of the furnace is eccentric, relative to the central longitudinal axis of the tube of the furnace, in the direction that is opposite to the one where the feedstock (2) is found. Thus, when the furnace (1) rotates, the feedstock (2) is always toward the bottom of the tube of the furnace (1); the heating element (4, 4', 4") is therefore arranged so as to be found in the top part of the tube of the furnace (1). In general, the height at which the heating element is arranged is selected so that the entire feedstock in movement and optionally at rest is to be "illuminated" by the radiation. The heating element (4, 4', 4") is thus in general located in the upper half of the tube, at a distance that exceeds the radius of the tube of the surface (3) from the feedstock bed. The element can be placed in the plane of symmetry of the tube (in the center) or else offset on the side so as to better "illuminate" the feedstock that is inclined because of the rotation and is thus higher on one side than the other.

Its length is at least equal to that of the tube of the furnace (1) so as to be able to be attached to each of its ends. This heating element (4, 4', 4") is attached independently of the tube of the furnace (1): it does not have a point of contact with the tube of the furnace (1) except perhaps by its ends; it does not rotate with the furnace (1). It is attached at its ends by techniques, well known to one skilled in the art, making it possible to maintain the sealing that is desired and necessary for the heat treatment in the rotary furnace (1). The complete heating element is thus in general at least as long as the furnace to be attached, but the heating part can be shorter or in several parts to facilitate the temperature adjustment. According to one variant of the invention, the heating element can comprise several zones at different temperatures. This can make it possible, for example, to conduct drying in a first zone and then the roasting in a subsequent zone.

The section of the heating element (4, 4', 4") can be in different shapes: polygonal (square, rectangle, . . . ), round, egg-shaped . . . . In general, for a better effectiveness of heat treatment, the section of the heating element (4, 4', 4") is flat, i.e., more wide than tall relative to the top and bottom parts of the tube of the rotary furnace (1).

The width of the heating element is in general between $1/60^{th}$ and $2/3$ of the inside diameter of the tube of the furnace and preferably between $1/15^{th}$ and $1/2$ of the inside diameter of the tube of the rotary furnace. The height is in general between $1/20$ and $4/4$ of the width of the heating element and preferably between $1/10$ and $1/2$ of the heating element.

It is also possible that the heating element is composed of several heating elements that are placed side by side, which makes it possible to have a large width and a small height.

The heating element (4, 4', 4") with a flat section can be curved in the direction of the width upward or downward, i.e., convex (4") or concave (4") as illustrated in FIGS. 2 and 3. For the same element, the width of the element can be constant or variable.

The heating element (4, 4', 4") is optionally solid or hollow, according to the heating mode that is used for heating it and then making it possible to emit radiation. It can be sealed or perforated to allow a portion of hot gases to pass into the furnace.

The heating element (4, 4', 4") is optionally heating over its entire length, i.e., over the entire length of the furnace also, or only over a portion of its length. In general, when the heating element (4, 4', 4") is heated over only a portion of its length, its initial part, corresponding to the beginning of the reaction and at the input of the feedstock into the furnace, is heated and heating. This portion also corresponds to the zone of the furnace (1) where the particle temperature is the lowest, in particular where the drying of the residual humidity takes place.

The heating of the heating element (4, 4', 4") can be done by any means that is known to one skilled in the art, and, for example, using one of the following means:

Circulation of a very hot gas that is obtained, for example, from the combustion of a solid, liquid or gas fuel, in particular lignocellulosic biomass, whereby the hot gas can be used subsequently to produce vapor and/or electricity (turbine). In this case, the hot gas circulates inside the heating element that is hollow without contact with the atmosphere of the furnace.

Circulation of a very hot gas that is obtained, for example, from the combustion of a solid, liquid or gas fuel, in particular lignocellulosic biomass, whereby the hot gas is mixed with the atmosphere of the heat treatment furnace thus supplying additional heat. The temperature of the smoke is adjusted so that the temperature of the gases that are contained in the furnace is always less than the critical temperature of biomass. In this case, the gas circulates inside the element that is not hermetic and allows a portion of the gas to escape into the heat treatment furnace, for example through perforations of a size of between several microns (porosity) or centimeters (orifices). The hot gas should not contain oxygen.

Combustion of gas in the heating element, whereby the hot gas can be used subsequently for producing vapor and/or electricity (turbine). In this case, the hot gas circulates inside the heating element, which is hollow without contact with the atmosphere of the furnace.

Combustion of gas in the heating element, whereby the hot gas is mixed with the atmosphere of the heat treatment furnace that thus supplies additional heat. The temperature of the smoke is adjusted so that the temperature of the gases that are contained in the furnace is always less than the critical temperature of biomass. In this case, the gas circulates inside the element that is not hermetic and allows a portion of the gas to escape into the heat treatment furnace, for example through perforations of a size of between several microns (porosity) or centimeters (orifices). The hot gas should not contain oxygen.

In the case of combustion, the feedstock (2) is not exposed directly to the flame but to the radiation that is emitted by the heating element (4, 4', 4"), itself heated by the flame of the combustion or the hot gases.

Electric means. In this implementation, an electrical conductor is heated by the Joule effect to temperatures of greater than 500° C. The conductor may be directly exposed to the atmosphere of the furnace but is preferably protected from the latter by means of a protective material (ceramic or metal).

To limit the zone (6) for emission of radiation only toward the feedstock bed (2), the heating element (4, 4', 4") is combined with at least one deflector panel (5, 5'). The deflector panel (5, 5') is placed on the sides and above the heating element (4, 4', 4") relative to the feedstock that is found below the heating element (4, 4', 4") to ensure that the rotary tube is not heated by the radiative flow. This panel (5, 5') surrounds the element (4, 4', 4'>) at the side opposite to the feedstock (2). It is the same length as the heating element (4, 4', 4"). It can consist of a single part or several parts (51, 52, 52', 53, 53') and, for example, three parts that are linked to one another and that form a central part (51) that is arranged above the heating element and two sides (52, 53, 52', 53') that are arranged on both sides of the central part (51). It is longitudinal and can be in the shape of a half-tube (5') as illustrated in FIG. 2 or comprise angles that are formed by the connection of different parts (51, 52, 53) that constitute the panel (5). The two sides (52, 52', 53, 53') of this panel have a size that makes it possible for them to go beyond the heating element (4, 4', 4"). According to one embodiment of the invention, it is necessary to provide a space between the panel and the heating element of a minimum of 5 cm, and preferably more than 10 cm to make it possible for the panels to be cooled by circulation of gas between the heating element and the panel and to prevent overheating.

In all of the cases, the two sides (52, 52', 53, 53') are oriented so as to form an angle that makes it possible for the radiation to cover the entire surface (3) of the bed of the feedstock (2). The material that is used for this panel (5, 5') is a reflective material that prevents the rays from passing and is heat-resistant. The material that is used can be of any type of material and in particular reflective materials for preventing them from heating in their turn: aluminum, for example, having the necessary properties to be used in the device according to the invention, well known to one skilled in the art. In this way, the rays that are emitted above the heating element (4, 4', 4") are sent via the panel (5, 5') to the feedstock (3) that is located below the heating element (4, 4', 4"). In the same way as the heating element (4, 4', 4"), this panel (5, 5') is attached by each of its two ends and does not rotate with the furnace (1). It has virtually no point of contact with the walls of the tube of the furnace (1) or with the heating element (4, 4', 4"). It is possible, however, to tolerate points of contact with the furnace and optionally the heating element for mechanical reasons of rigidity. The panel is attached at its ends by techniques, well known to one skilled in the art, making it possible to maintain the sealing that is desired and necessary for the heat treatment in the rotary furnace (1).

The presence of this panel (5, 5') thus forms a cone (6) of rays directed only toward the feedstock (3). The inside wall of the tube of the rotary furnace (1) is not heated unnecessarily; there is no risk of overheating and all of the rays are directed toward the feedstock, which makes possible a more effective heating and thus increases the heat treatment capacity and in particular roasting of the furnace.

The device according to the invention thus makes it possible to conduct the roasting of solid material and in particular biomass chips whose thickness is in general between 1 mm and 30 mm, the width is in general between 1 mm and 40 mm, and the length is in general between 1 mm and 100 mm, at temperatures of in general between 80° C. and 400° C., and preferably between 150° C. and 280° C., and in the absence of oxygen. The biomass that is treated in such a device, i.e., a heating rotary furnace (1) comprising a second source of heat provided by a heating element (4, 4') that is arranged in the furnace (1), makes it possible to obtain a roasted material that is more friable and therefore easier to grind. The particles that result from the grinding following the roasting are thus rounder.

In general, the heating element is used as the sole heating means, but it can also be used to heat the walls (at a controlled temperature) so as to simplify the installation. This can be advantageous for small installations where the heating is electric.

The following comparison example illustrates this invention.

EXAMPLE THAT IS ILLUSTRATED IN FIG. 1

In a rotary furnace (1) with a diameter of 6 m and a length of 20 m, a radiant element (4, 4', 4") is arranged that has the following characteristics:
Temperature of 800° C.,
Length of 20 m (that of the furnace),
Width of 0.5 m,
Flat shape,
Heated by passage of hot gas,
Placed at 4 m from the surface of the biomass bed (3).

The presence of the heating element (4, 4', 4") makes it possible to increase the heat treatment capacity of the rotary furnace (1) by 77% relative to a conventional rotary furnace that does not comprise an additional heating element.

One of the advantages of this invention is the increase in the amount of heat transferred to the feedstock per unit of length. The result is an increase in the iso-geometry capacity or a reduction of the size of the iso-capacity reactor.

In addition, this device can be installed in preexisting rotary furnaces at reduced cost.

French patent application Ser. No. 09/03.587 filed Jul. 21, 2009 is incorporated in its entirety by reference.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. Rotary furnace (1) for the heat treatment of solids comprising: at least one rotary tube in which the solids are introduced and which is adapted to be heated by a heater outside of the rotary tube for conducting a portion of the heat treatment in the absence of oxygen,
   a second heater element for heating the feedstock to improve the heat treatment, the second heater element formed by a heating element (4, 4', 4"), which does not rotate with the furnace, positioned inside the rotary tube and above the feedstock when the furnace rotates, and
   at least one deflector panel that surrounds the second heating element (4, 4', 4") at the side opposite to the feedstock (2) and positioned inside the rotary tube, wherein the deflector panel is attached by its ends independently of the tube of the furnace and does not rotate with the furnace, and
   wherein the second heating element (4, 4', 4") is rectilinear, extends longitudinal within the tube, and extends the entire length of the rotary furnace.

2. Rotary furnace according to claim 1, wherein the heating element (4, 4', 4") is polygonal or round or egg-shaped in cross-section.

3. Rotary furnace according to claim 1, wherein the cross-section of the heating element (4, 4', 4") is flat (4) or concave (4') or convex (4").

4. Rotary furnace according to claim 1, wherein the width of the heating element (4, 4', 4") is between $1/60^{th}$ and $2/3$ of the inside diameter of the tube of the furnace (1), and the height is between $1/20$ and $4/4$ of the width of the heating element (4, 4', 4").

5. Rotary furnace according to claim 1, wherein the second heating element (4, 4', 4") is attached by its ends, independently of the tube of the furnace (1).

6. Rotary furnace according to claim 1, wherein the position of the heating element (4, 4', 4") in the tube (1) of the furnace is eccentric, relative to the central longitudinal axis of the tube (1) of the furnace in a direction that is opposite to that where the feedstock (2) is positioned.

7. Rotary furnace according to claim 1, wherein the heating element (4, 4', 4") is hollow or solid, sealed or perforated.

8. Rotary furnace according to claim 1, wherein the heating element (4, 4', 4") is heated by circulation of a very hot gas inside the heating element, by combustion or by an electrical means.

9. Rotary furnace according to claim 1, wherein the deflector panel (5, 5') is longitudinal and of the same length as the heating element (4, 4', 4").

10. Rotary furnace according to claim 1, wherein the deflector panel (5, 5') comprises a single part or several parts (51, 52, 52', 53, 53') linked to one another to form a central part (51) arranged above the heating element and two sides (52, 53, 52', 53') arranged on both sides of the central part (51).

11. Rotary furnace according to claim 10, wherein the deflector panel (5, 5') is in the form of a half-tube (5') or comprises angles that are formed by the connection of different parts (51, 52, 53).

12. Rotary furnace according to claim 10, wherein the two sides (52, 52', 53, 53') of the deflector panel (5, 5') are of a length that makes it possible for the sides to extend beyond the heating element (4, 4', 4").

13. Rotary furnace according to claim 10, wherein the two sides (52, 52', 53, 53') are oriented to form an angle that allows the radiation (6) to cover the entire surface (3) of the bed of the feedstock (2).

14. A process comprising heat treating a biomass with the rotary furnace of claim 1.

15. The process of claim 14 wherein said heat treatment comprises roasting.

16. The process of claim 14 wherein said heat treatment comprises radiative heat treatment of biomass.

* * * * *